May 2, 1950
V. STOPKA
2,506,244
METHOD OF PRODUCING CERAMIC BODIES
HAVING LONGITUDINAL PASSAGES
Filed July 9, 1947
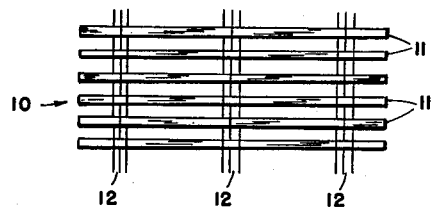
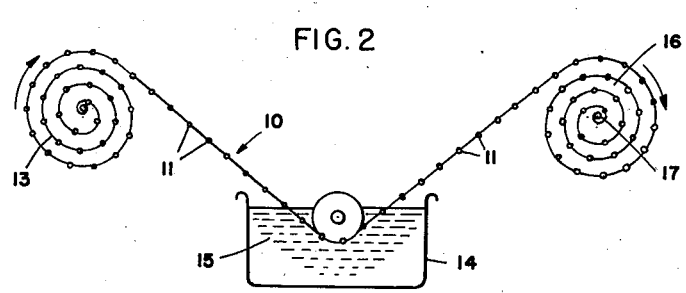
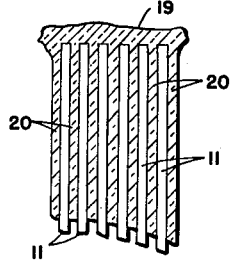 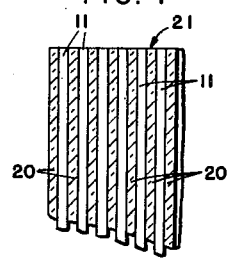 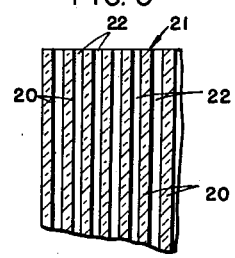
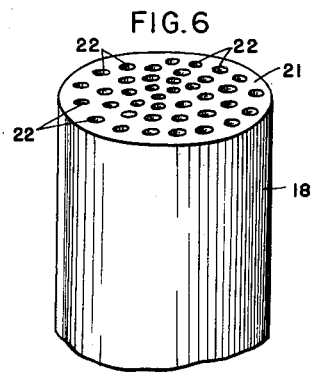
*INVENTOR:*
VICTOR STOPKA
BY
ATT'Y Patented May 2, 1950

2,506,244

UNITED STATES PATENT OFFICE 2,506,244

METHOD OF PRODUCING CERAMIC BODIES HAVING LONGITUDINAL PASSAGES

Viktor Stopka, Hrusov nad Odrou, Czechoslovakia, assignor to Spolek pro chemickou a lutni vyrobu, narodni podnik-United Chemical and Metallurgical Works, National Corporation, Prague, Czechoslovakia Application July 9, 1947, Serial No. 759,919
In Czechoslovakia June 28, 1945

Section 1, Public Law 690, August 8, 1946
Patent expires June 28, 1965

6 Claims. (Cl. 25—156)

This invention relates to a method of producing a ceramic body having longitudinal passages. For certain industrial purposes, such as for conducting and distributing a stream of hot gases in the case of surface combustion, for heat exchange, in exhaust tubes for combustion gases, cylindrical bodies are used which are made of ceramic material and are provided with a number of narrow passages parallel to the cylinder axis. Such cylindrical bodies have usually a diameter between about 40 mm. and 500 mm., or more, and their height is comprised within the limits of about 50 to 100 mm. Within the body there may be provided a larger central passage having a diameter of about 10 to 20 mm., or alternatively the body may be constructed without such passage. The narrow passages which may be of square, rectangular or circular cross-section, have an internal diameter of about 0.4 to 1 mm. and are closely spaced in order that the flow of gases through the body may be as free as possible. The thickness of the walls separating the individual passages one from the other should be at most 0.2 to 0.4 mm. For the given purpose it is required to have the bottom and top surfaces of the cylinder ground into exact planes. After the bodies have been burnt, they should have the following characteristics:

1. A high mechanical strength in view of the thin walls between the passages;
2. The drying and burning operations should not lead to the production of cracks in the mass;
3. After the burning operation the passages should remain free and their walls should be as smooth as possible;
4. The material should resist high temperatures up to 1000° C. without damage;
5. The material should have a low coefficient of expansion in order that the body may support without damage considerable thermal differences and sudden temperature changes within the limits of approximately 400 to 800 degrees centigrade.

For the manufacture of such bodies a ceramic material of the type of hard porcelain has been proposed to which in certain cases further components, such as talc, are added. Use has been made of a web or network consisting of a series of thin wooden rods or narrow tubes made of artificial material and connected together by means of a plurality of rows of textile threads. This web or network is immersed into the liquid ceramic mass which adheres to the network and then the web is coiled to a cylindrical roll. The rolls of web thus filled with ceramic material are allowed to dry and then are burnt whereby the organic material of the network burns down so that in the ceramic body there are formed narrow passages parallel to the cylinder axis and extending in the direction of the wooden pins or rods of the network. Finally the two bases of the cylindrical body are ground to plane surfaces.

The described known method of manufacturing ceramic bodies provided with narrow passages has various disadvantages. During the process of manufacture a thin layer of ceramic mass is formed on the uneven surface of the relatively roughly worked wooden rods and after drying this layer adheres strongly to the rod. During the subsequent burning process said thin layer of ceramic material is caused to separate from the other mass which forms the walls of the passages. After combustion of the carbonized wood the said separated residues of ceramic material, which are of relatively large size, remain in the passages together with the ash from the combustion of the wood, and after sintering of the ceramic material cause said passages to be clogged. Sometimes the separated portion of ceramic material adheres to the walls of the passages so that these walls are no longer smooth and their free cross-sectional area is reduced so that a considerable resistance is offered to the flow of gases.

Moreover the grinding of the bottom and top surfaces of the burnt bodies to exact planes is not practically achievable because the walls between the passages are thin and brittle, so that during the grinding operation they break off and clog the passages.

An object of the invention is to provide an improved method of manufacture which mitigates the above mentioned disadvantages, and to combine a series of steps in a definite sequence, so as to produce bodies which have substantially all the qualities required in such bodies.

Embodiments of the invention will now be described by way of example.

As the basic ceramic mass a hard porcelain type material is used containing 50% kaolin, 25% quartz and 25% feldspar, or a ceramic material similar to cordierite with 64% kaolin and 36% talc, or preferably a porcelain mass admixed with titanium dioxide $TiO_2$ is used, containing 33% kaolin, 16% feldspar, 16% quartz, 16% talc and 19% titanium dioxide. The ceramic mass should be very finely ground, or levigated and also should contain a certain amount of the so called sharpeners in order to prevent excessive shrinkage during drying and burning and to avoid cracks in the mass. The dry ceramic material should be well mixed and should pass completely through a No. 80 screen having 6400 meshes per square centimeter.

Further additions are made to the ceramic material, viz.: mineralizing agents in a proportion equivalent to 0.01–0.1% of the mass, for instance ammonium molybdate $(NH_4)_2MoO_3$, calcium fluoride $CaF_2$, sodium chloride $NaCl$, which accelerate the crystallisation of the melt, so that the so called ageing of the ceramic material after burning does not take place. Moreover alkaline plastifying agents are added, such as sodium carbonate $Na_2CO_3$, ammonia $NH_3$ and the like, in a proportion of 0.5–1%, whereby the mass is made suitably liquid with a relatively low content of water. Such low water content is desirable in order to avoid cracks being formed during the drying process. Finally the ceramic mass should contain an organic adhesive, such as dextrin, starch, sulphite lye or the like, which is used preferably in the form of aqueous solution and is added in a proportion of 2–10% to the water used for mixing the mass. The purpose of the adhesive is to secure for the ceramic mass after drying of the same that convenient mechanical strength which is necessary in order to permit grinding of the two front faces of the cylindrical body to exact planes. In accordance with this invention the grinding is effected prior to the burning step on bodies that are dried only and contain a plurality of wooden rods, which are ground at the same time and thus prevent splitting of the thin walls of the passages.

As soon as a ceramic mass of suitable consistency has been prepared the manufacture itself of the cylindrical bodies may be initiated. This will now be described in more detail with reference to the accompanying drawing, in which:

Fig. 1 shows a portion of the network to be passed through the ceramic bath;

Fig. 2 illustrates the process of drawing the network through the ceramic bath;

Figs. 3, 4 and 5 are fragmentary cross-sectional views of the coiled body, respectively, before the grinding operation, after the grinding operation and after the firing operation; and Fig. 6 is a perspective view of the finished product.

The network 10 is formed of wooden rods 11 interconnected by groups of textile filaments 12, each group consisting in the example shown in Fig. 1 of three filaments. The network 10 serves as a base for a coating of ceramic mass. The wooden rods 11 which form the weft of the network may be square, rectangular or circular in cross-section, of hard or soft wood, the thickness of the rods being 0.4–1 mm.

It has been found that the network 10 should be impregnated in order to avoid direct contact between the ceramic mass and the network and also to prevent the ceramic mass from sticking on the wooden rods. As an additional effect, the surface of the wood is made smooth by the impregnation. For such impregnation, water repelling substances are used, such as for instance paraffin, asphalt or certain artificial materials.

The impregnating substances are used either in solution in a suitable organic solvent, gasoline or benzene for paraffin, benzene for asphalt, or preferably in the form of aqueous emulsions containing 10–15% of impregnating substances. The use of aqueous emulsions has certain advantages over the use of solutions in organic solvents mainly on account of economy of impregnating substances and of expensive organic solvents. In the first alternative the impregnating substance is simply precipitated on the surface of the wooden rods and does not penetrate into the same, while in the second case it is very difficult to recuperate the organic solvents. The use of impregnated wooden rods in the production of bodies of the kind specified according to the present invention is of advantage because after the bodies have been burnt the passages in the same have smooth walls and are not clogged with ceramic material separated from their walls. The small amount of ash which remains in the passages after combustion of the wood may be easily removed by knocking or blowing out. Indeed, the ceramic mass does not adhere to the impregnated wood during drying and burning of the bodies so that the passages remain undisturbed.

In manufacturing the bodies the impregnated network 10 containing wooden rods 11, which network may be taken from a supply reel 13 is first drawn through a container 14 filled with the liquid ceramic mass 15 of which a suitable proportion is thus retained on the network 10. The network so wetted is coiled into a roll 16 either with a central cavity or without the same, the first being achieved by winding the web on a core 17 of suitable diameter. After the roll 16 has been so coiled no air bubbles or pores should remain in the interior of the same and the inner space should be entirely filled with ceramic mass. The outer layer of ceramic material formed on the surface of the coiled body 16 should be as thin as possible, and practically such an amount only of ceramic material is left on the surface of the body as may be retained on the same by adhesion.

The bodies so coiled are allowed to stay for a certain period and then are dried in a dryer at temperatures up to 120° C. When dry the bodies should be free from cracks and should have sufficient mechanical strength. In dried condition the bodies are ground to exact planes on the two end faces to obtain bodies of the kind indicated as 18 in Fig. 6. This grinding is preferably carried out by means of grinding tools on horizontally rotating iron plates to which carborundum or emery powder is supplied. The ends of the wooden rods 11 in the network 10 within the body 18 are exposed by the grinding operation so that easy liberation of the gaseous constituents from the wood during the burning process is secured. Without such grinding before burning of the bodies the gases are not free to escape because the ends of the wooden rods are covered with ceramic material 19 as shown in Fig. 3, and the body suffers considerable damage. Moreover, due to the small thickness of the passage walls 20, which is as low as 0.2–0.4 mm., the burnt bodies do not offer sufficient resistance to grinding and easily break off. During burning of bodies which have been ground in dry condition these draw-backs do not arise, the gases from the network 10 are free to escape so that the wood burns down, and clean, free passages are left after its combustion.

When the two end faces of which only the upper end face 21 is shown in the drawing have been ground, the bodies 18 are subjected to the burning operation during which they should be protected in shells. In this operation the bodies 18 may rest on a support made of the same unburnt ceramic material of which the bodies themselves are made. The burning is effected in the usual way, depending on the ceramic material used, at a temperature up to sintering temperature. The burning operation is carried out first at low speed without access of air up to the moment when the enclosed network has been degasified and then the bodies are further burnt in the presence of air in order that the carbonized network and the adhesive may burn down. The pores produced by the combustion of the adhesive are again closed when the material is sintered so that the finished body does not become porous. On the other hand the passages 22 remain clean with smooth walls and are not clogged at all. After burning and cooling the bodies 18 are ready for use and do not require any further treatment.

Another feature of the invention consists in assembling disc shaped bodies of larger diameter composed of individual sections. Bodies of large diameter lead to difficulties during the drying, grinding and burning and for this reason such bodies are assembled of individual sections having the shape of hexagonal regular prisms, sectors of hollow cylinder or other suitable shapes. The individual bodies are then assembled to final shape and are cemented together by means of a suitable cement consisting, for example, of water glass, powdered talc and titanium dioxide.

What I claim is:

1. A method of producing a cylindrical body of ceramic material provided with narrow passages parallel to the axis of said body, which is refractory and resistant to sudden temperature changes, the method comprising the combination of the following steps: adding to a basic ceramic mass selected from the group of materials consisting of hard porcelain, cordierite, and porcelain material with the addition of titanium dioxide mineralizing and plastifying agents and adhesives; drawing a web of network, the weft of which is formed by wooden rods impregnated with water-repelling substances, through said ceramic mass while liquid so as to apply ceramic material to said network; winding said network carrying the ceramic material into a roll to form a cylindrical body; drying said body, grinding said body, when dried, on its two end faces to exact planes so as to expose the ends of said wooden rods at said faces; and firing said dried cylindrical body first without access of air, and then in the presence of air to the point of sintering.

2. A method of producing a body with longitudinal passages in it, said method comprising the following steps: preparing a fluid adhesive ceramic mass comprising a member of the group consisting of hard porcelain, cordierite, and porcelain material with the addition of titanium dioxide; immersing in said mass a web of network including a series of longitudinal wooden rods so that the ceramic mass adheres to the web, coiling the web and adhering mass into a roll, drying said roll, grinding flat the ends of the dried roll so as to expose the ends of the wooden rods; heating the roll to sinter the ceramic mass and burn out the wooden rods, whereby a ceramic body having longitudinal passages is obtained.

3. A method of producing a composite body with longitudinal passages in it, which method comprises making a plurality of sectional bodies each in accordance with claim 2, placing said sectional bodies side by side and uniting them into a composite body by cementing.

4. The method claimed in claim 2 in which said ceramic mass comprises approximately 35% kaolin, 16% quartz, 16% feldspar, 16% talc and 19% titanium dioxide.

5. The method claimed in claim 2 in which said ceramic mass comprises approximately 50% kaolin, 25% quartz and 25% feldspar.

6. The method claimed in claim 2 in which said ceramic mass comprises approximately 64% kaolin and 36% talc.

VIKTOR STOPKA.

REFERENCES CITED

The following references are of record in the file of this patent:

UNITED STATES PATENTS

| Number | Name | Date |
|---|---|---|
| 1,767,586 | Hudson | June 24, 1930 |
| 2,095,252 | Hermann | Oct. 12, 1937 |
| 2,171,006 | Morgan et al. | Aug. 29, 1939 |

Certificate of Correction

Patent No. 2,506,244                                  May 2, 1950

VIKTOR STOPKA

It is hereby certified that the name of the assignee in the above numbered patent was erroneously described and specified as "Spolek pro chemickou a lutni vyrobu, narodni podnik-United Chemical and Metallurgical Works, National Corporation" whereas said name should have been described and specified as *Spolek pro chemickou a hutni vyrobu, narodni podnik-United Chemical and Metallurgical Works, National Corporation*; and that the said Letters Patent should be read with this correction therein that the same may conform to the record of the case in the Patent Office.

Signed and sealed this 19th day of September, A. D. 1950.

[SEAL]

THOMAS F. MURPHY,
*Assistant Commissioner of Patents.*